United States Patent
Cox

[11] 3,832,070
[45] Aug. 27, 1974

[54] CALIBRATION SYSTEM FOR REFLECTION DENSITOMETERS

[75] Inventor: James R. Cox, Richardson, Tex.

[73] Assignee: Cosar Corporation, Garland, Tex.

[22] Filed: Apr. 27, 1973

[21] Appl. No.: 355,023

[52] U.S. Cl................. 356/209, 356/191, 356/243, 356/256
[51] Int. Cl. .......................................... G01n 21/48
[58] Field of Search ............. 356/42, 173, 176, 177, 356/178, 179, 191–195, 243, 244, 256, 202, 209–212; 73/1 R

[56] References Cited
UNITED STATES PATENTS

| 2,094,158 | 9/1937 | Luckiesh | 356/243 |
| 2,370,683 | 3/1945 | Palma | 356/42 X |
| 3,437,819 | 4/1939 | Simmons | 356/177 |
| 3,609,045 | 9/1971 | Stein | 356/243 X |
| 3,669,543 | 6/1972 | Vaccaro | 356/42 |

Primary Examiner—Ronald L. Wibert
Assistant Examiner—F. L. Evans
Attorney, Agent, or Firm—Richards, Harris & Medlock

[57] ABSTRACT

In a reflection densitometer calibration system, a calibration standard comprises a paper sheet having color zones printed thereon, including the colors white, black, and shades of blue, red and yellow. The paper sheet is laminated between two transparent plastic sheets which enclose the paper sheet and form a protective covering over the color zones. Strips of a transparent writing accepting material are then secured to the outer surface of the plastic layer which overlies the color zones.

After the calibration standard is fabricated, the optical densities of the color zones are determined by means of a master reflection densitometer. An indication of the optical density of each color zone is then written on the portion of the writing accepting strip adjacent the color zone. The calibration standard is then ready for use in calibrating reflection densitometers.

18 Claims, 2 Drawing Figures

PATENTED AUG 27 1974     3,832,070

CALIBRATION SYSTEM FOR REFLECTION DENSITOMETERS

BACKGROUND AND SUMMARY OF THE INVENTION

This invention relates to a reflection densitometer calibration system, and more particularly to a process of and an apparatus for calibrating reflection densitometers by means of printed color zones.

Reflection densitometers are used in the graphic arts industry to perform a variety of functions. For example, color printing sheets are typically provided with a strip extending along one edge including bars of pure color, for example, black, white, and shades of blue, red and yellow. When a particular sheet of this type has been approved for production, the color density of these color bars is determined with a reflection densitometer. Thereafter, during production runs, the color bars on the edges of corresponding printed sheets are checked with a reflection densitometer to assure that the approved color densities are being maintained.

Another use for reflection densitometers is in the area of photography. A reflection densitometer may be used to determine the optical density of the brightest or "highlight" areas and the darkest or "shadow" areas of the subject to be photographed. These values are then utilized in adjusting the exposure controls of the camera and thereby assuring a correct exposure.

Still another use of reflection densitometers relates to color film processing. Color film manufacturers provide test strips which if processed properly will bear color bars having known densitometer readings. These strips may therefore be utilized to check the operating parameters of a processing system before the system is used to process exposed film.

As is well known in the art, the proper use of a reflection densitometer requires periodic rechecking of the calibration of the instrument, typically on a daily basis. Heretofore it has been the practice to calibrate reflection densitometers by means of calibration standards comprising ceramic chips having color zones formed thereon. These color zones are typically varying shades of gray because, as of this time, it is considered to be substantially impossible to provide the desired shades of blue, red and yellow on a ceramic chip.

The use of ceramic chip type calibration standards in the calibration of reflection densitometers incorporates a number of inherently disadvantageous characteristics. Perhaps the most undesirable feature of this practice involves the substantial impossibility of obtaining the desired shades of blue, red and yellow on a ceramic chip. Another disadvantage relates to the relatively high cost of ceramic chip type calibration standards. Still another disadvantage involves the fact that ceramic chip type standards are considered to be substantially permanent. For this reason there is often only one such calibration standard available at a given location. This is undesirable because, if a situation should subsequently arise which causes a question to occur as to whether the color zones on the chip may have been damaged, there is substantially no way to recheck the optical densities of the color zones against a known standard.

The present invention relates to a reflection densitometer calibration system which overcomes the foregoing and other problems long since associated with the prior art. In accordance with the broader aspects of the invention, a reflection densitometer calibration standard comprises a plurality of printed color zones. For example, the standard may be provided with zones comprising such diverse colors as white, black, and the desired shades of blue, red and yellow. It is recognized that due to variances in the printing process and for other reasons, the color zones of reflection densitometer calibration standards incorporating the invention will not all have exactly the same optical density. Therefore, the optical density of each color zone is determined by means of a master reflection densitometer, and is written on a portion of the calibration standard adjacent the particular color zone.

In the practice of the invention, a pair of calibration standards fabricated in accordance with the foregoing procedure are supplied with each reflection densitometer. One of these calibration standards is used as a working standard. That is, one of the calibration standards is kept with the reflection densitometer and is used on a daily basis to recheck the calibration thereof. The other calibration standard is kept in a secure location so as not to be exposed to light, or other potentially harmful elements, and is used solely as a reference standard. Then, whenever it is desired to check the working standard for possible deterioration, the reference standard is readily available for use in checking the calibration of the reflection densitometer against a known standard.

It will be appreciated that reflection densitometer calibration standards incorporating the invention are adapted to be manufactured on an extremely economical basis. It is therefore considered desirable to supply replacement calibration standards for each reflection densitometer on a periodic basis. This is to eliminate any possible deterioration of the printed color zones which may occur in the calibration standards that were originally supplied with the reflection densitometer due to aging.

In accordance with more specific aspects of the invention, calibration standards for use in fabricating reflection densitometers are fabricated by printing a plurality of color zones on one side of a paper sheet. The sheet may also be provided with printing designating an area adjacent each color zone for receiving a written indication of the optical density of the zone. The printed sheet is then laminated between two transparent plastic layers which enclose the paper layer and provide a protective covering overlying the color zones. A writing receiving zone is then provided on the exterior surface of the transparent plastic layer which overlies the color zones. This may comprise either a portion of the transparent layer treated to accept writing, or a strip of transparent writing receiving material secured to the exterior surface of the transparent plastic layer.

Following fabrication of the calibration standard, each color zone of the calibration standard is examined by means of a master reflection densitometer. This provides an output indicative of the optical density of the zone which is then written on the writing accepting portion of the exterior surface of the calibration standard. If the printed sheet is provided with areas adjacent each color zone designated to receive the optical density indication relating to the zone, this information is preferably written in each such area. The calibration standard is then ready for use, and may either be included with a reflection densitometer when it is shipped to a customer, or may be forwarded to a customer for use with a previously purchased reflection densitometer.

DESCRIPTION OF THE DRAWINGS

A more complete understanding of the invention may be had by referring to the following Detailed Description when taken in conjunction with the accompanying Drawings, wherein.

DETAILED DESCRIPTION

Figure 1:
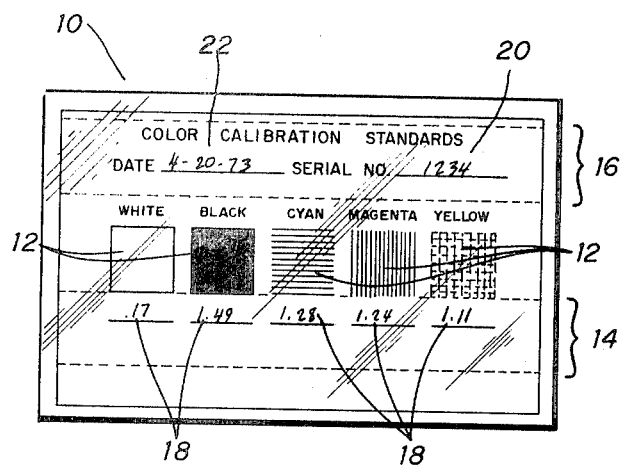
FIG. 1 is a top view of a reflection densitometer calibration standard incorporating the invention.
Figure 2:
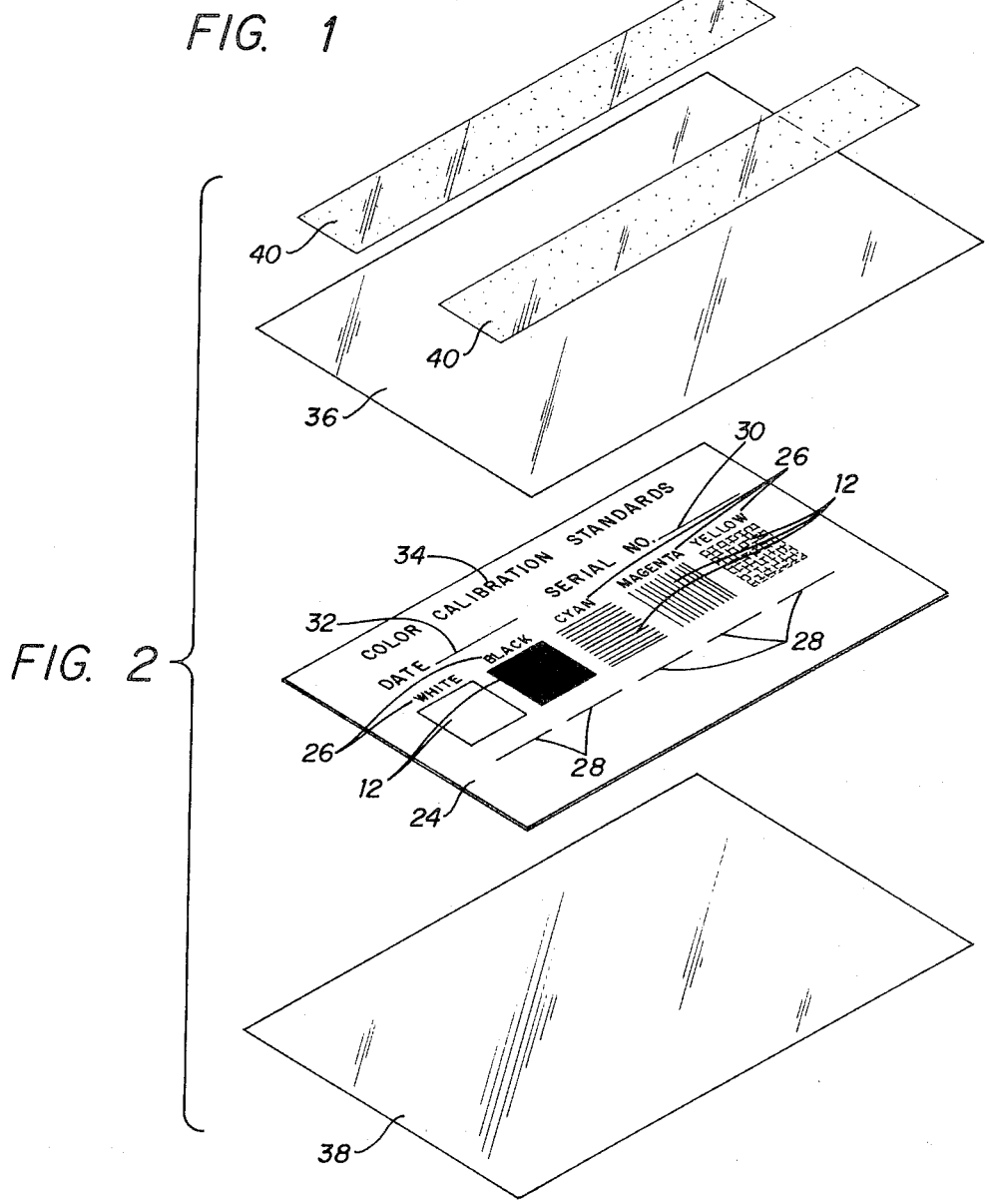
FIG. 2 is an exploded view of the color calibration standard illustrated in FIG. 1.

Referring now to the Drawings, and particularly to FIG. 1 thereof, there is shown a reflection densitometer calibration standard 10 incorporating the present invention. The calibration standard 10 comprises a series of color zones 12 typically including a white zone, a black zone, and zones comprising shades of blue, red and yellow. The particular blue and red shades used in the embodiment of the invention shown in FIGS. 1 and 2 are cyan and magenta. These shades, and a particular yellow shade, are preferred in view of their relative permanence and because they comprise the preferred shades for use in reflection densitometer calibration. It will be understood, however, that different shades of blue, red and yellow, as well as entirely different colors, may be used in the practice of the invention, if desired.

The calibration standard 10 further comprises zones 14 and 16 on the outer surface thereof which are adapted to receive writing. The zone 14 comprises a series of areas 18 adjacent the color zones 12 and each adapted to receive a written indication of the optical density of the adjacent color zone. The zone 16 comprises an area 20 adapted to receive the Serial Number of the calibration standard 10, and an area 22 adapted to receive the date upon which the optical densities of the color zones 12 of the calibration standard were measured.

The fabrication of the calibration standard 10 will be better understood by reference to FIG. 2. A substantially opaque paper sheet 24 is printed to provide the color zones 12. Each color zone 12 may be provided with a printed legend 26 extending adjacent to the zone, if desired. The sheet 24 is also printed to provide a series of blank lines 28 designating the areas 18 of the calibration standard 10. Blank lines 30 and 32 representing the areas 20 and 22 are similarly provided. Additional printed information 34 may also be provided on the paper sheet 24 in accordance with particular requirements.

Following the printing process, the paper sheet 24 is laminated between two plastic layers 36 and 38. These layers fully enclose the paper sheet 24, and thereby provide a protective covering extending over the printed color zones 12. In the particular embodiment of the invention illustrated in the Drawings, both of the layers 36 and 38 are transparent sheets formed from the material marketed by E. I. duPont de Nemours & Co., Inc. under the trademark "MYLAR." It will be understood, however, that in view of the fact that the paper sheet 24 is not printed on the reverse side, the layer 38 may comprise an opaque or a transluscent layer, if desired.

The writing receiving zones 14 and 16 are next formed on the outer surface of the layer 36. In the particular embodiment of the invention illustrated in FIG. 2, the writing receiving zones 14 and 16 are formed by securing strips of a transparent writing receiving material 40 to the exterior surface of the layer 36. For example, the material marketed by 3M Corporation under the trademark "MAGIC TAPE" must be used in the practice of the invention. The writing receiving zones 14 and 16 may also be formed by spraying an outer surface of the layer 36 with a writing receiving material. Finally, by means of conventional techniques it is possible to etch the outer surface of the layer 36 so as to provide the writing receiving zones 14 and 16 thereon.

Following the fabrication of the calibration standard 10, the optical density of each color zone 12 of the calibration standard 10 is determined by means of a master reflection densitometer, which is calibrated using suitable master calibration standards. Each of the optical density measurements thus obtained is written in the area 18 of the writing receiving zone 14 adjacent to the corresponding color zone 12. The writing step may be carried out by means of a conventional ball-point pen or similar instrument, depending on the manner in which the writing receiving zone is formed. At the same time the Serial Number of the calibration standard is entered in the area 20, and the date upon which the measurements were taken is entered in the area 22. The calibration standard 10 then has the general appearance illustrated in FIG. 1, and is ready for distribution to a customer.

In the practice of the invention, it is considered desirable to include two calibration standards of the type shown in FIG. 1 with a reflection densitometer when the instrument is shipped to a customer. This permits the customer to keep one of the calibration standards with the instrument as a working standard. That is, the working standard is used to recheck the calibration of the instrument at required intervals, i.e., daily. The other standard which is received by the customer with the reflection densitometer is kept as a reference standard. This standard is preferably maintained in a location such that it is not exposed to light or other conditions potentially damaging to the color zones. Then, in the event deterioration of the working standard is suspected, the calibration of the reflection densitometer may be cross-checked against the reference standard. By means of this cross-checking procedure, the extent of deterioration, if any, of the working standard is easily noted.

It will be understood that by means of the fabrication technique illustrated in FIG. 2, reflection densitometer calibration standards of the type shown in FIG. 1 may be manufactured economically. It is therefore considered desirable to forward replacement calibration standards to customers on a periodic basis. The purpose of this procedure is to permit replacement of the original standards, and thereby obviate any deterioration of the reference calibration standard originally provided to the customer due to aging.

From the foregoing it will be understood that the present invention comprises a reflection densitometer calibration standard incorporating numerous advantages over the prior art. Perhaps the most important advantage derived from the use of the invention relates to the fact that calibration standards incorporating the invention include color zones comprising the desired shades of blue, red and yellow in addition to the usual black and white zones. Another advantage deriving from the use of the invention relates to the fact that color calibration standards incorporating the invention may be manufactured at an extremely low cost. Still another advantage involves the fact that by means of the present invention it is practical to supply dual calibration standards with a reflection densitometer instrument, thereby permitting one of the calibration standards to be maintained as a reference standard.

Although particular embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

What is claimed is:

1. A reflection densitometer calibration process comprising:
   forming a plurality of zones of different color on a sheet;
   covering at least the color zones of the sheet with a transparent protective layer;
   determining the optical density of each of the color zones by means of a master reflection densitometer;
   writing an indication of the optical density of each zone in an area adjacent the zone;
   checking the optical density of each zone with a second reflection densitometer; and
   adjusting the operation of the second reflection densitometer such that the optical density indication provided thereby for each zone matches the written optical density indication of the zone.

2. The reflection densitometer calibration process according to claim 1 further characterized by:
   printing the color zones on a paper layer; and
   laminating the paper layer between two transparent plastic layers.

3. The reflection densitometer calibration process according to claim 2 further characterized by:
   forming a writing receiving zone on at least one of the plastic layers; and
   writing the indication of optical density for each color zone on the writing receiving zone.

4. The reflection densitometer calibration process according to claim 3 wherein the step of forming a writing receiving zone is carried out by securing at least one strip of transparent writing receiving material to the outer surface of the transparent layer.

5. A reflection densitometer calibration process comprising:
   printing at least one side of a substantially opaque layer to provide a plurality of zones each comprising a different color;
   covering at least the printed side of the opaque layer with a substantially transparent protective layer;
   forming at least one writing accepting zone on the transparent layer overlying the color zones on the opaque layer;
   determining the optical density of each of the color zones;
   writing an indication of the optical density of each zone in the writing accepting zone;
   analyzing each color zone by means of a reflection densitometer to provide an output indicative of the optical density of the zone; and
   adjusting the operating parameters of the reflection densitometer so that the optical density output generated thereby for each color zone matches the written optical density indication relating to that zone.

6. The reflection densitometer calibration process according to claim 5 further characterized by printing a substantially white zone, a substantially black zone, a zone comprising a shade of blue, a zone comprising a shade of red, and a zone comprising a shade of yellow on the opaque layer.

7. The reflection densitometer calibration process according to claim 5 further characterized by:
   printing the color zones and means designating a writing receiving area corresponding to each zone on a paper sheet; and
   laminating the paper sheet between two plastic sheets.

8. The reflection densitometer calibration process according to claim 7 wherein the writing accepting zones are formed by applying strips of a writing accepting material to the plastic sheet on the printed side of the paper sheet.

9. A reflection densitometer calibration apparatus comprising:
   a substantially opaque sheet having formed thereon a plurality of color zones;
   each of said color zones comprising a substantially different color from the remainder of the color zones;
   means forming a transparent protective layer extending over at least the portions of the opaque sheet having the color zones formed thereon; and
   means forming a writing receiving zone on the exterior of the apparatus for receiving a written indication of the optical density of each color zone and thereby facilitating the use of the apparatus in the calibration of reflection densitometers.

10. The reflection densitometer calibration apparatus according to claim 9 wherein the transparent sheet comprises a paper layer, and wherein the color zones are printed on the paper layer.

11. The reflection densitometer calibration apparatus according to claim 10 wherein the protective means comprises a pair of transparent plastic layers extending on the opposite sides of and enclosing the paper layer.

12. The reflection densitometer calibration apparatus according to claim 10 wherein the writing receiving means is formed on the outside of the transparent plastic layer extending adjacent the color zones on the paper layer.

13. The reflection densitometer calibration apparatus according to claim 12 wherein the writing receiving means comprises a substantially transparent writing receiving layer secured to the outside surface of the transparent plastic layer.

14. A reflection densitometer calibration apparatus comprising:
   a paper layer having printed thereon a plurality of color zones adapted for the calibration of reflection densitometers;

each of said color zones comprising a substantially different color from the remainder of the color zones;

a pair of plastic layers extending adjacent the opposite sides of the paper sheet and entirely enclosing the paper sheet for the protection of the color zones thereon;

at least the portion of the plastic layer overlying the color zones being transparent; and means forming a writing receiving zone on at least a portion of the outside surface of at least one of the plastic layers for receiving written indications of the optical densities of the color zones on the paper layer and thereby facilitating use of the apparatus in the calibration of reflection densitometers.

15. The reflection densitometer calibration apparatus according to claim 14 wherein the paper layer further comprises means designating an area immediately adjacent each color zone for receiving a written designation of the optical density of the adjacent color zone.

16. The reflection densitometer calibration apparatus according to claim 15 wherein the writing receiving zone on the outer surface of the plastic layer overlies the writing receiving areas of the paper layer.

17. The reflection densitometer calibration apparatus according to claim 16 wherein the means forming the writing receiving zone comprises a strip of substantially transparent writing receiving material secured to the outer surface of the plastic layer.

18. The reflection densitometer calibration apparatus according to claim 14 wherein the colors of the zones include: white, black and shades of blue, red and yellow.

* * * * *